US012141529B1

(12) United States Patent
Nezri et al.

(10) Patent No.: US 12,141,529 B1
(45) Date of Patent: Nov. 12, 2024

(54) RELEVANT OBJECT EMBEDDING IN AGGREGATED ANSWERS TO QUESTIONS REGARDING BROAD SET OF OBJECTS

(71) Applicant: Amazon Technologies, Inc., Seattle, WA (US)

(72) Inventors: Yuval Nezri, Kiriat Tivon (IL); Eilon Sheetrit, Haifa (IL); Lital Kuchy, Haifa (IL); Avihai Mejer, Atlit (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 325 days.

(21) Appl. No.: 17/701,427

(22) Filed: Mar. 22, 2022

(51) Int. Cl.
*G06F 40/295* (2020.01)
*G06F 16/9032* (2019.01)
*G06F 40/40* (2020.01)
*G06N 5/04* (2023.01)
*G06N 20/00* (2019.01)
*G06F 40/205* (2020.01)
*G06F 40/30* (2020.01)

(52) U.S. Cl.
CPC ...... *G06F 40/295* (2020.01); *G06F 16/90332* (2019.01); *G06F 40/40* (2020.01); *G06N 5/04* (2013.01); *G06N 20/00* (2019.01); *G06F 40/205* (2020.01); *G06F 40/30* (2020.01)

(58) Field of Classification Search
CPC .......... G10L 15/22; G10L 15/1822; G10L 2015/223; G10L 15/1815; G10L 15/18; G06F 40/30; G06F 40/295; G06F 40/279; G06F 40/205; G06F 16/90332; G06F 16/41
See application file for complete search history.

(56) References Cited

U.S. PATENT DOCUMENTS

| | | | |
|---|---|---|---|
| 11,144,811 B2* | 10/2021 | Abdallah | G06F 16/50 |
| 11,182,432 B2* | 11/2021 | Shi | G06F 16/90332 |
| 11,380,308 B1* | 7/2022 | Pandey | G06N 20/00 |
| 11,507,607 B2* | 11/2022 | Ganapathy | G06F 16/3344 |
| 11,568,863 B1* | 1/2023 | Sarikaya | G10L 15/02 |
| 11,626,107 B1* | 4/2023 | Hajebi | G06F 40/295 |
| | | | 704/235 |
| 11,789,940 B2* | 10/2023 | Jiao | G06F 16/243 |
| | | | 707/771 |
| 11,847,424 B1* | 12/2023 | Harkous | G06N 3/045 |
| 11,880,659 B2* | 1/2024 | Pentyala | G06N 20/00 |
| 2014/0006012 A1* | 1/2014 | Zhou | G06F 16/3344 |
| | | | 704/9 |

(Continued)

*Primary Examiner* — Vijay B Chawan
(74) *Attorney, Agent, or Firm* — K&L Gates LLP

(57) ABSTRACT

Natural language-based question answering systems and techniques are generally described. In some examples, a natural language processing system, first natural language data. The natural language processing system may determine first slot data included in the first natural language data. A set of content items associated with the first slot data may be determined. A first machine learning model may use the first natural language data to generate prediction data associated with a first attribute among a list of attributes of the set of content items. In some examples, a first value associated with the first attribute for a first content item of the set of content items may be determined. Second natural language data may be generated based at least in part on the first value. The second natural language data may include a response to the first natural language data.

20 Claims, 10 Drawing Sheets

(56) References Cited

U.S. PATENT DOCUMENTS

| | | | |
|---|---|---|---|
| 2017/0213157 A1* | 7/2017 | Bugay | G06F 40/30 |
| 2020/0218722 A1* | 7/2020 | Mai | G06F 16/24522 |
| 2021/0049158 A1* | 2/2021 | Jiao | G06F 16/243 |
| 2022/0116341 A1* | 4/2022 | Smullen | H04L 51/04 |
| 2022/0207073 A1* | 6/2022 | Sohail | G10L 15/22 |

* cited by examiner

FIG. 8B

RELEVANT OBJECT EMBEDDING IN AGGREGATED ANSWERS TO QUESTIONS REGARDING BROAD SET OF OBJECTS

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

BRIEF DESCRIPTION OF DRAWINGS

FIGS. 8A-8C depict example response templates generated using the natural language-based question answering system described herein, in accordance with various aspects of the present disclosure.

DETAILED DESCRIPTION

Figure 1:
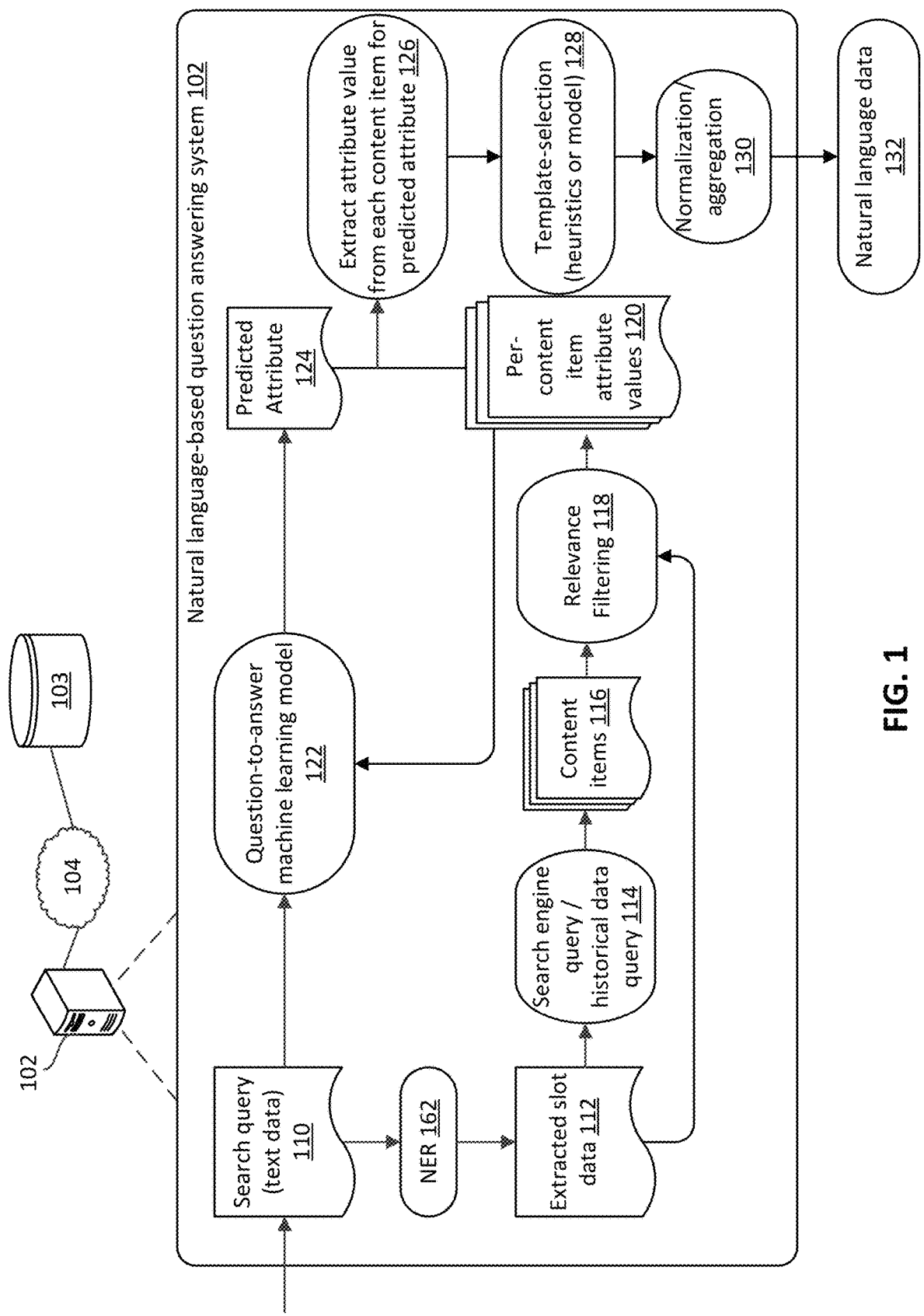
FIG. 1 is a diagram depicting an example natural language-based question answering system, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Computer-implemented natural language processing systems, such as those described herein, may be used to process natural language input to interpret such input and take some action in response. For example, natural language processing systems may be used to interpret spoken language, text, and/or other forms of symbolic natural language input. In some cases, a user may input natural language data that asks a question. For example, users may ask questions of speech-processing enabled virtual assistants and/or online search engines in order to have the systems generate a response to their questions. In some cases, the subject matter of a user's question relates to a specific entity. For example, a user may ask "When was Barack Obama born?" This natural language input relates to a specific person. Computer-implemented natural language understanding (NLU) techniques may determine that the intent (e.g., the semantic interpretation) of the input is to determine a birth date of an entity. Similarly, named entity recognition (NER) processing may be used to identify the slot data [name="Barack Obama"] (or similar). Accordingly, a record pertaining to the individual entity Barack Obama may be queried to determine a birth date (e.g., by querying a [birth_date] field of the record. A response may be generated to answer the input question (e.g., "Barack Obama was born on Aug. 4, 1961.").

However, in some cases, users may ask more general questions. For example, instead of asking a question related to a specific entity, a user may ask a question that relates to a genus or class of entities. For example, a user may ask questions such as, "Do jeans shrink after washing," "How much power do air conditioners use," "Can I put plastic dishes in a dishwasher," etc. The foregoing questions do not relate to specific entities (e.g., specific content items), but instead relate to general items (e.g., plastic dishes, air conditioners, jeans). Existing computer-implemented natural language processing and/or understanding techniques may not be able to answer such questions since there is not a single data record identified in the question that is appropriate to query for these types of questions. Additionally, it may be non-trivial for computer-based natural language processing systems to identify which records to use to answer such questions, and/or how to aggregate different information from different entities that may be relevant. Described herein are various systems and techniques that may be used to enable computing device(s) to provide responsive answers to such "broad" questions. Current natural language processing systems are unable to provide satisfactory responses to such broad, non-specific questions in many instances. Accordingly, the various techniques described herein constitute technical improvements to computer-implemented natural language processing systems that enable such systems to generate appropriate responses to general questions that may not relate to specific entities and/or data records. Various examples are provided herein where questions relate to classes of content items for illustrative purposes. However, the natural language-based question answering systems and techniques described herein are not limited to answering questions related to content items. Indeed, any types of questions may be answered using the various techniques described herein. The various natural language-based question answering systems and techniques described herein are effective to answer multiple types of questions, such as yes/no questions, numeric questions, and categorical questions, in a dynamic way.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the natural language processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data (e.g., computer-executable commands) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills and/or other types of speech processing software.

Machine learning techniques, such as those described herein, are often used to form predictions, solve problems, recognize and interpret natural language data, etc. For example, machine learning techniques may be used to determine semantic interpretations of spoken language, translate text from one spoken language to another, identify objects in image data, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize the cost. For example, the machine learning model may use a gradient descent algorithm to incrementally adjust the weights to cause the most rapid decrease to the output of the loss function. The method of updating the parameters of the machine learning model is often referred to as back propagation.

FIG. 1 is a diagram depicting an example natural language-based question answering system 102, in accordance with various aspects of the present disclosure. In various examples, one or more computing devices may be used to implement natural language-based question answering system 102. The one or more computing devices may be configured in communication over a network 104. Network 104 may be a communication network such as a local area network (LAN), a wide area network (such as the Internet), or some combination thereof. The one or more computing devices implementing the natural language-based question answering system 102 may communicate with non-transitory computer-readable memory 103 (e.g., either locally or over network 104). Non-transitory computer-readable memory 103 may store instructions that may be effective to perform one or more of the various techniques described herein (e.g., when executed by one or more processors). For example, the instructions may be effective to implement one or more of the various machine learning models described herein.

A natural language input (e.g., text and/or speech) comprising a question may be received. Various natural language processing techniques may be performed. For example, ASR may be used to transform a spoken natural language input into text. In other examples, text may be entered by the user (e.g., in a search field of a mobile application and/or website). In either case, search query 110 may be generated (comprising text data representing the user question). As described in further detail below, named entity recognition 162 may be used to extract slot data 112 from the search query 110. The extracted slot data 112 may represent an entity name present in the search query 110. Entity names may include general or specific names of entities such as people, places, content items, etc. For example, in the user query "Can plastic dishes be safely placed in a dishwasher" the slot data "plastic dishes" and/or "dishwasher" may be extracted. Content items may refer to any type of content, depending on the desired implementation. For example, content items may include objects, items available via an e-commerce service, movies and/or songs available via a streaming service, entries in a database pertaining to entities having one or more attributes, etc.

The extracted slot data may be used to determine a set of content items 116 that pertain in some way to the extracted slot data. In one example, a search query may be generated using the extracted slot data 112. This search query may be executed as a backend process using a search engine without outputting results of the search query to the user (block 114). The search engine may retrieve the results (e.g., content items 116) that are deemed to be most relevant to the extracted slot data 112. In another example implementation, the extracted slot data 112 may be used to query historical data (block 114) to determine key word matches (e.g., instances of historical data that includes the extracted slot data 112). An example of such an historical data query may be a database of historical transactions (e.g., purchases of plastic dishes, instances of plastic dishes being added to a virtual shopping cart, searches related to plastic dishes, dishwashers, etc.). In at least some further examples, a deep learning model may be used to determine the set of content items 116 that are relevant to the extracted slot data 112 (e.g., from among a database of candidate content items).

Data representing the content items 116 (e.g., text data describing the content items, titles of the content items, images of the content items, etc.) may be featurized (e.g., transformed into a numerical representation such as an array) and input into a relevance filtering model 118. The relevance filtering model 118 may be a machine learning model trained to determine whether or not a given content item among the set of content items 116 is semantically relevant to the extracted slot data 112. Accordingly, a data representation of the extracted slot data 112 may also be input into the relevance filtering model 118. In one example implementation, the relevance filtering model 118 may be a supervised machine learning model trained on pairs of slot data and content items to determine whether provided slot data is relevant to a given content item. Accordingly, relevance filtering model 118 may be used to filter the set of content items to determine a subset of the content items 116 that are most relevant to the extracted slot data 112.

Each content item 116 may have a set of attributes with each attribute, in turn, being associated with an attribute value. For example, if a given content item is a mobile phone, its attributes may include color, operating system, memory size, processor type, storage capacity, etc. Each of the attributes may be associated with an attribute value. For example, the attribute value for the attribute color may be "burgundy." The attribute value for the attribute memory size may be 6 gigabytes, etc. After relevance filtering by relevance filtering model 118, the per-content item attribute values 120 may be extracted (for each attribute of each of the filtered set of content items 116).

Search query 110 may be provided to question-to-answer machine learning model 122. Question-to-answer machine learning model 122 is described in further detail below with respect to FIG. 3. For each content item, the question-to-answer machine learning model 122 may generate a prediction score for each attribute based on the relevance of that attribute to the search query 110. For example, the search query 110 may be "How long are pocket knives." The content items 116 (and the filtered subset of the content items 116) may include a variety of different knives. For a first pocket knife by a first manufacturer, the first pocket knife may have an attribute called "length," an attribute called "width," an attribute called "blade material," an attribute called "handle material," etc. Each of these attributes of the first pocket knife may be associated with a respective attribute value. The question-to-answer machine learning model 122 may generate respective relevance scores for each attribute that represents the likelihood that the input search query 110 relates to the respective attribute. In the current example, for the search query 110 "How long are pocket knives," and for the first pocket knife, the attribute "length" may have a relevance score of 0.9, the attribute "blade material" may have a relevance score of 0.1, the attribute "handle material" may have a relevance score of 0.2, etc. In this example, higher relevance scores indicate higher relevance of an attribute to a search query. However, in other implementations lower relevance scores may indicate higher relevance.

The question-to-answer machine learning model 122 may be used to determine a predicted attribute 124 (e.g., prediction data) for the search query 110. The predicted attribute 124 may be determined using a variety of techniques. In one example, the highest relevance score from among all attributes, for all content items may be selected as the predicted attribute 124. In another example, the attributes for each content item may be separately ranked on the basis of the relevance scores output by the question-to-answer machine learning model 122 for each content item. Thereafter, the attribute that has the top ranked relevance score the most number of times across all content items may be selected as the predicted attribute 124. In some examples, the attribute with the highest average relevance score across all candidate items may be selected.

The per-content item attribute values 120 may be extracted for each attribute from the filtered set of content items 116. Thereafter, the attribute value for the predicted attribute 124 may be determined for each content item (block 126). Accordingly, if the query is "How long are pocket knives," each filtered candidate item may be some type of knife and/or pocket knife. The predicted attribute may be "length," and the filtered candidate items may have attribute values indicating a variety of different lengths. At block 128, template selection may be used to determine an appropriate template for response. Some templates may be for numerical answers (e.g., providing a range of the relevant attribute values and/or an average of the values). Some templates may be for yes/no questions to provide a natural response (e.g., a response that might be said by a native speaker) to the question. Some templates may answer categorical questions (e.g., for the question "What colors does Brand X paint come in" a categorical response may list different content items pertaining to Brand X paint along with their color attribute values). In some cases, a machine learning model may be used to determine the appropriate response template to use by inputting the search query 110 into the model to select a most relevant template. In other examples, a heuristic based approach may be used to select the most appropriate template (e.g., based on the predicted attribute 124 and one or more conditions). At block 130, normalization and/or aggregation of the attribute values may be performed. Normalization may include standardizing units or dimensions of the attribute value to generate normalized attribute values so that attribute values are of the same dimensions. For example, some attribute values for the attribute length may be in centimeters while other attribute values may be in inches. Accordingly, normalization in this example may include conversion of inches to centimeters or centimeters to inches. Aggregation may include averaging the attribute values, determining a range of the attribute values (e.g., from 2.7 cm to 8.8 cm), rejecting statistical outlier values to avoid skewing the response (e.g., values with standard deviation ≥2 or some other suitable value), etc.

Once the template is selected and the attribute values are normalized and/or aggregated, the natural language data 132 may be generated by populating the template with the extracted attribute values for the content items in a natural language response. Further examples are provided below.

Figure 2:
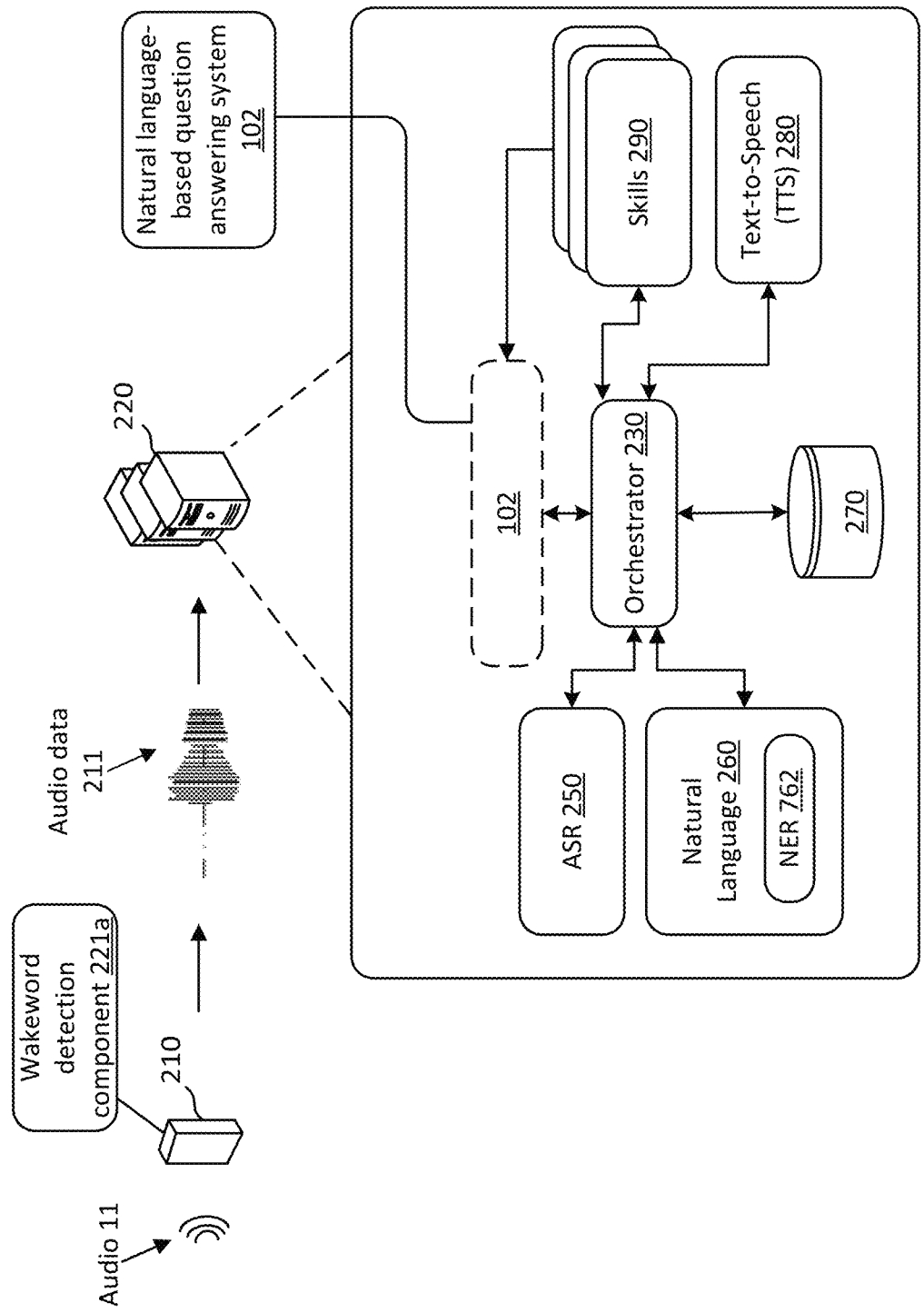
FIG. 2 is a block diagram illustrating example components of a natural language processing system, in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. For example, natural language processing system 220 may be executed wholly or in part by one or more of devices 210, as well as one or more other devices. Communication between various components may occur directly or across a network(s). For example, ASR output data (e.g., text data representing a current utterance) output by ASR component 250 may be used to determine an intent of the utterance by natural language component 260. Thereafter, orchestrator component 230 may route the intent to one or more skill components 290 effective to process the intent (as well as slot data included in the utterance) to perform an action. In some cases, the action may include output of synthesized speech using the TTS component 280.

An audio capture component(s), such as a microphone or array of microphones of the device 210 (e.g., a network-connected device that is enabled with natural language processing capability), captures audio 11. The device 210 may process the audio data, representing the audio 11, to determine whether speech is detected. The devices 210 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 210 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 210 may use a wakeword detection component 221a to perform wakeword detection to determine when a user intends to speak an input to the devices 210. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword.

The wakeword detection components 221a may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221a may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 210, the natural language processing system 220, etc.) to execute the intent. For example, if the text data corresponds to "call John," the NLU component 260 may determine an intent that the system establish a two-way communication channel between the device 210 originating the call and a device of the recipient "John" (a named entity in the utterance). For further example, if the text data corresponds to "turn up volume on Artist X," the NLU component 260 may determine an intent that the system turn up the volume of playback. Named entity recognition 762 (NER component 762) may be used to determine the slot data, such as names of one or more entities present in the request. In the current example request NER component 762 may identify the slot data "Artist X."

The NLU component 260 outputs NLU results to the orchestrator component 230. The NLU results may include an NLU hypothesis, including a representation of an intent and corresponding slot data (e.g., "Artist X" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill 290. As described herein, in various examples, the skill component 290 may execute a capability runtime service (CRS) which may call a target determination component (not shown) for determining a device that may be targeted for the requested action/output. If the NLU results include multiple NLU hypotheses, the orchestrator component 230 may send a portion of the NLU results corresponding to the top scoring NLU hypothesis to a skill 290 associated with the top scoring NLU hypothesis.

In various examples, a classifier (not shown) may be used to determine the type of natural language input. For example, the classifier may determine that a request "turn on the lights" is a request to control a network-connected device. In another example, the classifier may determine that the request "what colors do Brand X toothbrushes come in" is a request to answer questions about a content item. In various examples, natural language inputs that are classified as questions pertaining to content items may be routed to natural language-based question answering system 102. In such examples, slot data identified by NER component 762, the text data output by ASR component 250, and/or the NLU output data (e.g., intent data) may be sent to the natural language-based question and answering system 102 for further processing as previously described.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 210 or a gateway system in order to complete certain functions. Inputs to a skill component 290 may come from various interactions and input sources.

In various examples, natural language-based question answering system 102 may be implemented by one or more skills 290.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, question answering skills, as well as custom skills that are not associated with any pre-configured type of skill. A skill may also be associated with media operations that may be performed by an media processing unit. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 210.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, settings, and the like. The system and techniques can be implemented on a geographic basis to ensure compliance with laws in various jurisdictions and objects in which the component(s) of the system(s) and/or user are located. Permissions may be obtained from a user associated with the device 210, or other devices discussed herein.

Figure 3:
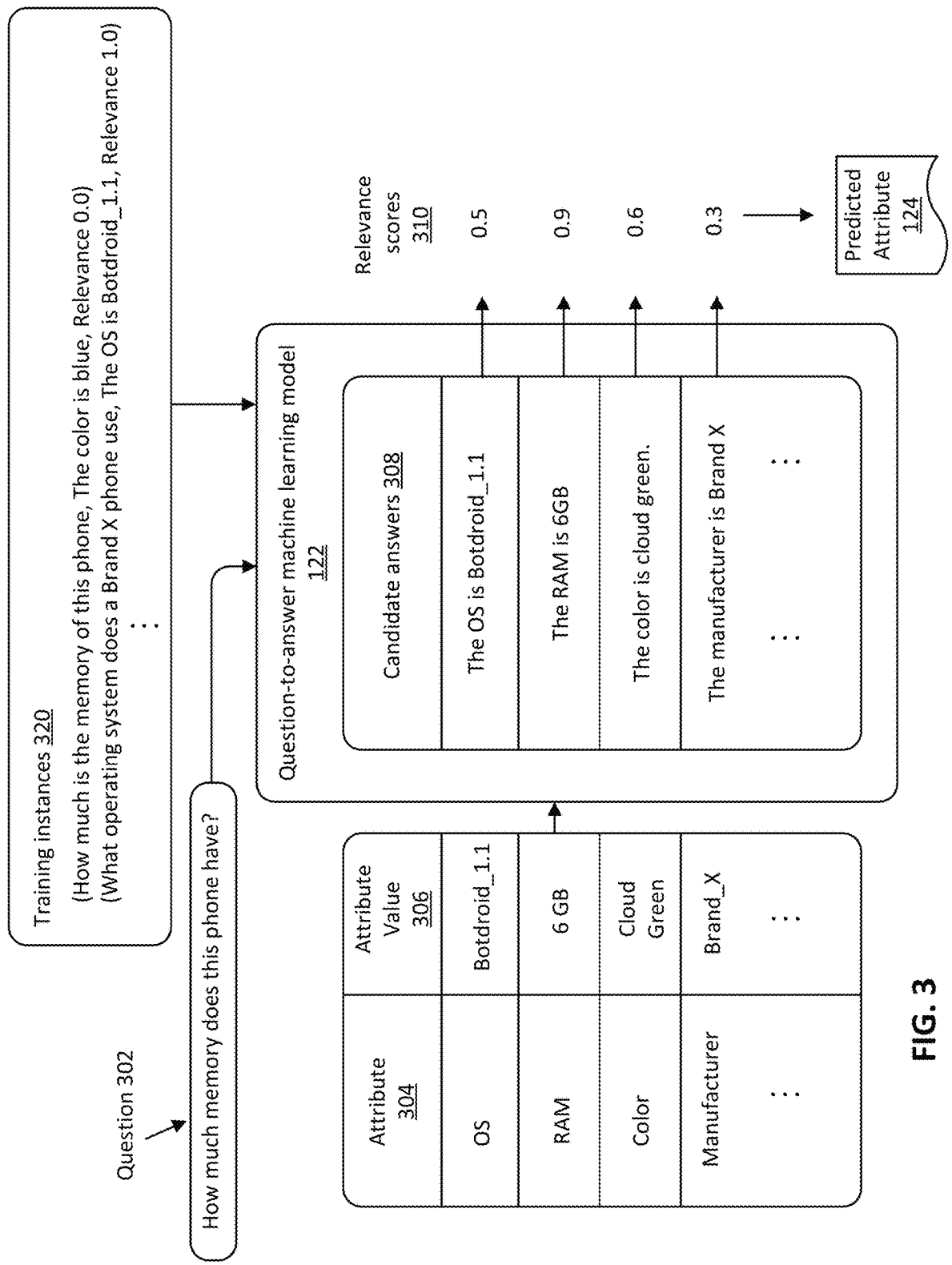
FIG. 3 is an example of a machine learning architecture effective to predict relevant content attributes based on natural language inputs, in accordance with various aspects of the present disclosure.

FIG. 3 is an example of a machine learning architecture effective to predict relevant content attributes based on natural language inputs, in accordance with various aspects of the present disclosure. A given database of content items may be associated with a data schema (e.g., a structured data representation) that comprises a number of attributes 304 for the content items. A given content item may have an attribute value 306 for one or more of the attributes 304. In some cases, one or more attributes may not be appropriate for a given content item. In such cases, the attribute value(s) for such attributes may be a null value. For example, if the content item is a baseball the attribute value 306 for the attribute 304 "RAM" may be null.

The question-to-answer machine learning model 122 may be trained using a corpus of natural language question text and answer text. The answer text may be generated using the structured attribute/attribute value key pairs of the content item database. For example, for the attribute/attribute value pair Operating system/Android. The answer text "The operating system is Android" may be generated. In some cases, the generic form "The [attribute] is/are [attribute value]" may be used. Although special cases may be manually composed. Accordingly, training instances (including training instances 320) may comprise pairs of natural language question text, natural language answer text, and a binary ground truth score indicating whether the answer text is relevant to the question text.

A first example training instance 320 (How much is the memory of this phone, The color is blue, Relevance 0.0) is depicted in FIG. 3. This indicates that the answer text "The color is blue" is not relevant to the question text "How much is the memory of this phone." In a second example training instance 320 (What operating system does a Brand X phone use, The OS is Botdroid_1.1, Relevance 1.0), the relevance score of 1.0 indicates that the answer text "The OS is Botdroid_1.1" is relevant to the question text "What operating system does a Brand X phone use."

The question-to-answer machine learning model 122 is trained using such a training corpus to generate relevance scores 310 for each attribute by generating natural language text answers (e.g., candidate answers 308) for each attribute and predicting the relevance score 310 for each candidate answer. Cross entropy loss may be used to determine the error between predictions and ground truth labels using the training instances 320, and back propagation may be used to update parameters of the question-to-answer machine learning model 122. Accordingly, for the natural language question 302 "How much memory does this phone have" the attributes 304 and attribute values 306 may be determined. As described previously in reference to FIG. 1, the attributes 304 and attribute values 306 may be extracted for each of the filtered set of content items 116 (e.g., the per-content item attribute values 120 may be determined for each content item after filtering the set of content items 116 by relevance filtering model 118). Accordingly, the process shown in FIG. 3 may be performed for each content item of the filtered set of content items. The example in FIG. 3 illustrates this process for a single content item (e.g., a particular phone having the attributes 304 and the attribute values 306). The question-to-answer machine learning model 122 generates the candidate answers 308 for each attribute 304/attribute value 306 pair. Candidate answers include "The OS is Botdroid 1.1," "The RAM is 6 GB," "The color is cloud green," "The manufacturer is Brand X," etc. The question-to-answer machine learning model 122 predicts a relevance score 310 for each candidate answer 308. Thereafter the relevance scores 310 may be used to rank the candidate answers 308. Since each candidate answer 308 corresponds to a single attribute 304, the relevance scores 310 may also be used to determine a predicted attribute 124.

As previously described, the predicted attribute 124 may be selected as the attribute with the highest relevance score across all attributes and across all content items. However, in other examples, the predicted attribute 124 may be selected as the attribute that was predicted as the top-ranked attribute the highest number of times across all content items.

Figure 4:
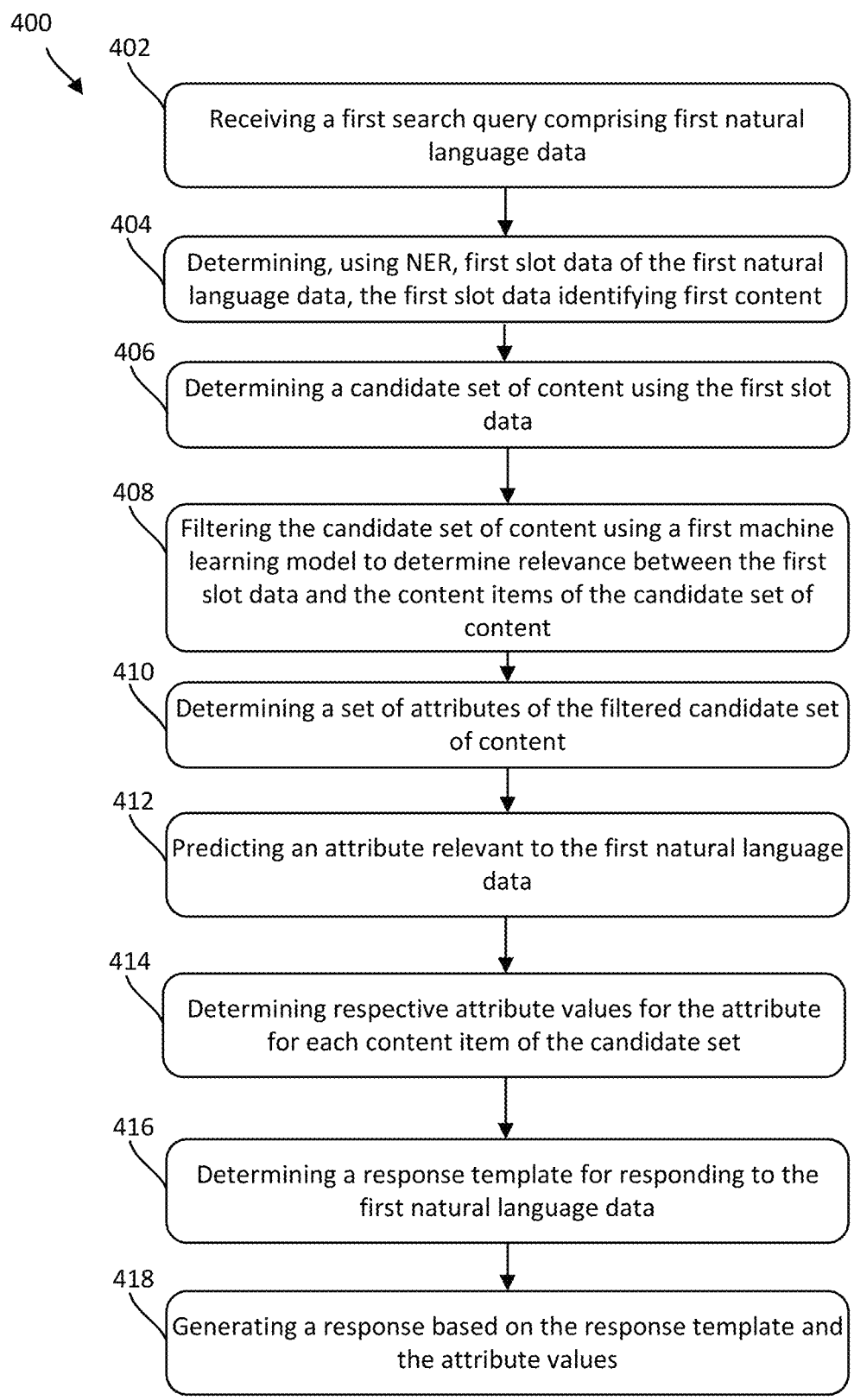
FIG. 4 depicts an example process for answering natural language-based questions regarding content, in accordance with various aspects of the present disclosure.

FIG. 4 depicts an example process 400 for answering natural language-based questions regarding content, in accordance with various aspects of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

Although the figures and discussion illustrate certain operational steps of the system in a particular order, the steps described may be performed in a different order (as well as certain steps removed or added) without departing from the intent of the disclosure.

Process 400 may begin at action 402, at which a first search query comprising first natural language data may be received. The first search query may be input as text and/or as speech. If the input is in the form of speech, ASR component 250 may transform the audio data into text or another structured data representation of the natural language data. The first natural language data may comprise a question entered into a search field (e.g., of a search engine), a spoken request (e.g., to a virtual assistant and/or other speech interface), etc.

Processing may continue at action 404, at which NER may be used to determine first slot data of the first natural language data, the first slot data identifying first content. The first slot data may identify an entity and/or a class of an entity. For example, in the natural language input "Are movies from Studio X funny," [Studio_X] may be identified as the first slot data using NER (e.g., NER component 762). In another example, in the natural language input "Do cotton shirts shrink," [cotton clothes] may be identified as the first slot data that identifies a category of clothing (e.g., shirts made of the material cotton).

Processing may continue at action 406, at which a candidate set of content may be determined using the first slot data. For example, a database of historical data (e.g., web traffic data (e.g., clickstream data, views, likes, hits, etc.), historical add-to-cart data (for an e-commerce service), purchase data, etc.) may be searched using the first slot data to determine content items in which the first slot data was used (and/or in which permutations of the words in the first slot data were used). In some other examples, the first slot data may be used to generate a search engine query and may be input into the search engine to determine the top X results, where the top X results represent the candidate set of content. In this latter, search engine-based approach, the search query (query data) and the candidate results may not be exposed to the user that input the first search query (at action 402).

Processing may continue at action 408, at which the candidate set of content may be filtered using a first machine learning model to determine relevance between the first slot data and each content item of the candidate set of content. For example, the candidate set of content may be filtered using a machine learning model such as relevance filtering model 118. The first machine learning model may be trained to determine whether or not a given content item among the candidate set of content items is semantically relevant to the first slot data. Accordingly, a data representation of the first slot data may also be input into the first machine learning model. In one example implementation, the first machine learning model may be a supervised machine learning model (e.g., a neural network-based classifier) trained on pairs of slot data and content items to determine whether provided slot data is relevant to a given content item. Accordingly, the first machine learning model may be used to filter the set of content items to determine a subset of the candidate set of content items that are most relevant to the extracted first slot data. The features from the candidate set of items used by the first machine learning model for prediction may include textual features related to the textual descriptions of the items, the title of the items, data representation of images (and/or image features) of the items (e.g., determined using one or more convolutional layers), etc.

Processing may continue at action 410, at which a set of attributes of the filtered candidate set of content may be determined. The candidate set of content may be represented by structured data (e.g., by a common data schema) that has different fields, field IDs, values, etc. Various fields may be defined (e.g., in a schema) as pertaining to a particular attribute. Similarly, the value in such fields may be the attribute value for the relevant attribute. The set of attributes may be determined for each content item in the filtered candidate set of content.

Processing may continue at action 412, at which an attribute relevant to the first natural language data may be predicted. In various examples, the question-to-answer machine learning model 122 may be used to predict the attribute (e.g., predicted attribute 124), as described above. For example, for each candidate item, a relevance score may be generated by the question-to-answer machine learning model representing the relevance for each attribute of the subject candidate item for the input first natural language data. The relevance scores for each attribute, across all candidate items, may be used to determine the attribute most relevant to the first natural language data. Note that while the first machine learning model at action 408 uses the extracted first slot data during prediction, the question-to-answer machine learning model 122 models relevance between each attribute and the user's input question (e.g., the first natural language data).

Processing may continue at action 414, at which respective attribute values may be determined for each content item of the filtered candidate set of content items. After predicting an attribute at action 412, the attribute value for each candidate content item for the predicted attribute may be determined. For example, if memory size is the predicted attribute, the memory size of each different device among the candidate set of content items may be determined (e.g., by parsing the structured data representing the content items to determine the value in the "memory size" field). Attribute values may be normalized to standardize units.

Processing may continue at action 416, at which a response template for responding to the first natural language data may be determined. In various examples, different response templates may be used for different types of input questions. For example, yes/no input questions may evaluate a condition using the extracted attribute value for the predicted attribute and may provide a simple yes/no answer (e.g., along with contextual information such as representations of one or more candidate items considered). Numerical questions may ask a question related to a numerical attribute value and the response template may provide a range of attribute values and/or an average of the attribute values for the candidate content items, depending on the desired implementation. In various examples, statistical outlier attribute values may be excluded from the attribute values to avoid skewing the results. In various examples, rule-based heuristics may be used to determine the appropriate response template. In other examples, a machine learning model may be used to predict a relevant response template based on at least one of the input natural language data (e.g., the user question) and the predicted attribute.

Processing may continue at action 418, at which a response may be generated based on the response template and the attribute values. The attribute values extracted at action 414 may be used to populate the response template to answer the user question. Examples of such response templates are provided in FIG. 8.

Figure 5:
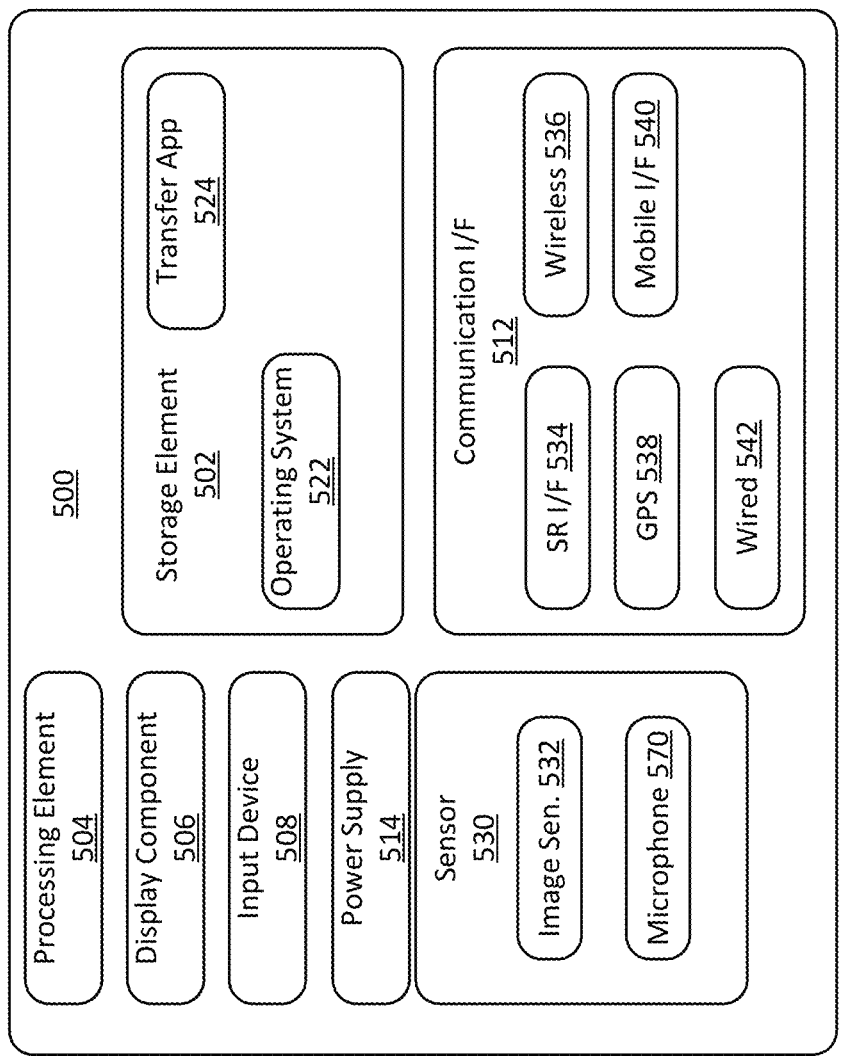
FIG. 5 is a block diagram showing an example architecture of a computing device that may be used in accordance with various aspects of the present disclosure.

FIG. 5 is a block diagram showing an example architecture 500 of a computing device that may be used to instantiate various components of the natural language-based question answering system 102, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
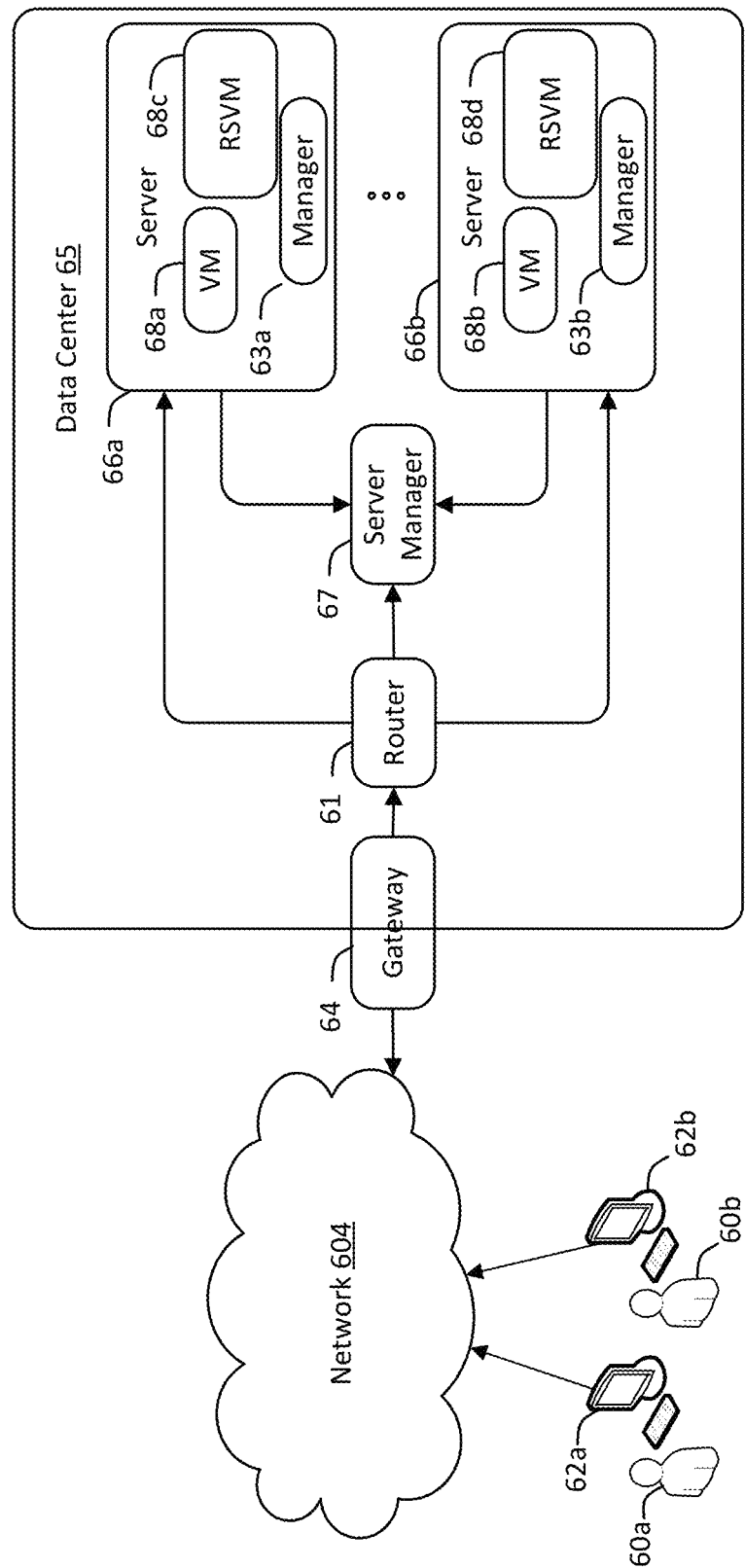
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and nonvolatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
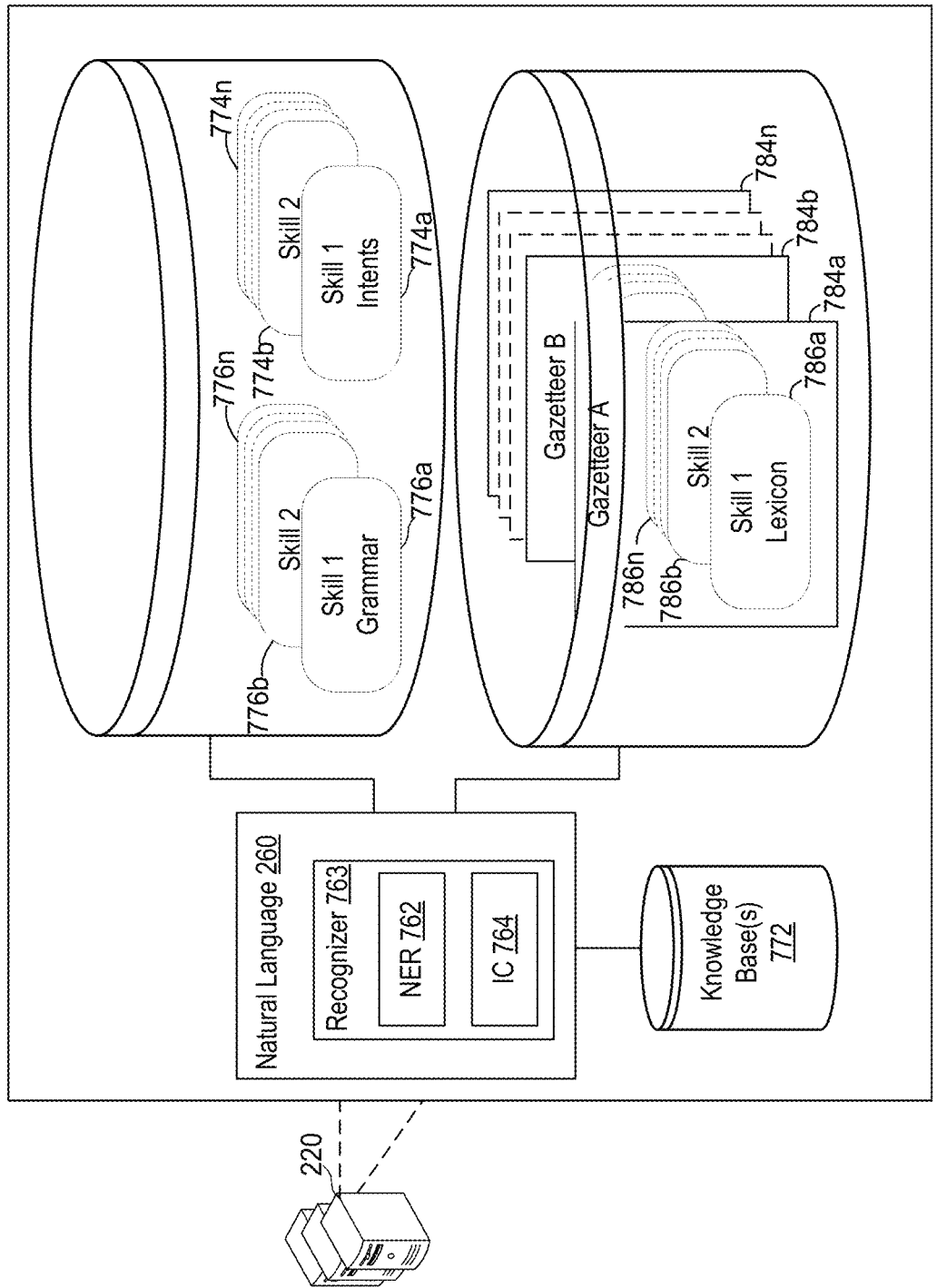
FIG. 7 is a conceptual diagram illustrating named entity recognition processing, according to embodiments of the present disclosure.

FIG. 7 illustrates an example of how NLU processing and NER processing may be performed to determine intent data and/or slot data for a given natural language input. For example, NER 762 may be used to determine slot data in an input natural language request that identifies a content item and/or a general class of a content item. Generally, the Natural language component 260 attempts to make a semantic interpretation of text data input thereto. That is, the natural language component 260 determines the meaning behind text data based on the individual words and/or phrases represented therein. The natural language component 260 interprets text data to derive an intent of the user as well as pieces of the text data that allow a device to complete that action.

The natural language component 260 may process ASR output data (e.g., text) including several ASR hypotheses. The natural language component 260 may process all (or a portion of) the ASR hypotheses input therein. Even though the ASR component 250 may output multiple ASR hypotheses, the natural language component 260 may be configured to only process with respect to the top scoring ASR hypothesis.

The natural language component 260 may include one or more recognizers 763. Each recognizer 763 may be associated with a different skill 290. Each recognizer 763 may process with respect to text data input to the natural language component 260. Each recognizer 763 may operate at least partially in parallel with other recognizers 763 of the natural language component 260.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity that may be applicable to processing performed by a skill 290. The NER component 762 (or other component of the natural language component 260) may also determine whether a word refers to an entity whose identity is not explicitly mentioned in the text data, for example "him," "her," "it" or other anaphora, exophora or the like.

Each recognizer 763, and more specifically each NER component 762, may be associated with a particular grammar model and/or database, a particular set of intents/actions (e.g., in intents database 774), and a particular personalized lexicon 786. Each gazetteer 784 may include skill-indexed lexical information associated with a particular user and/or device. For example, a Gazetteer A (784*a*) includes skill-indexed lexicon 786*a* to 786*n*. A user's music skill lexical information might include attribute names such as album titles, artist names, and song names, for example, whereas a user's contact list skill lexical information might include the names of contacts. Since every user's music collection and contact list is presumably different, this personalized information improves entity resolution.

An NER component 762 applies grammar models 776 and lexicon 786 to determine a mention of one or more entities in text data. In this manner, the NER component 762 identifies "slot data" or simply "slots" (corresponding to one or more entities present in text data) that may be used for later processing. The NER component 762 may also label each slot with a type (e.g., noun, place, city, artist name, song name, etc.). As previously described, such slot data may be used by task data service 164 to perform a lookup based on the slot data to determine which devices are associated with the slot data (e.g., where the slot data identifies some aspect of the content being played by the devices).

Each grammar model 776 includes the names of entities (i.e., nouns) commonly found in speech about the particular skill 290 to which the grammar model 776 relates, whereas the lexicon 786 is personalized to the user and/or the device (e.g., smart-home system 157) from which the user input originated. For example, a grammar model 776 associated with a shopping skill may include a database of words commonly used when people discuss shopping.

Each recognizer 763 may also include an intent classification (IC) component 764. An IC component 764 parses text data to determine an intent(s). An intent represents an action a user desires be performed. An IC component 764 may communicate with an intents database 774 of words linked to intents. For example, a music intent database may link words and phrases such as "quiet," "volume off," and "mute" to a <Mute> intent. An IC component 764 identifies potential intents by comparing words and phrases in text data to the words and phrases in an intents database 774.

The intents identifiable by a specific IC component 764 are linked to skill-specific grammar models 776 with "slots" to be filled. Each slot of a grammar model 776 corresponds to a portion of text data that the system believes corresponds to an entity. For example, a grammar model 776 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 776 may not be structured as sentences, but rather based on associating slots with grammatical tags. In some examples, an utterance including one or more slots (e.g., an {artist name}, {movie title}, etc.) may be associated with a first intent and/or a first skill. However, in some cases, lexicon of a different skill and/or intent may be used to identify the particular entity referred to in the utterance (e.g., if the particular entity is not included in the lexicon of the associated first intent and/or first skill). Accordingly, lexicon and/or grammar of various skills may be mixed with intents associated with other skills to determine the appropriate entity referred to by the utterances.

For example, an NER component 762 may parse text data to identify words as subject, object, verb, preposition, etc. based on grammar rules and/or models prior to recognizing named entities in the text data. An IC component 764 (e.g., implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786, attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as hidden Markov models, maximum entropy models, log linear models, conditional random fields (CRF), and the like. For example, an NER component 762 implemented by a music recognizer may parse and tag text data corresponding to "play Song Y by Artist X" as {Verb}: "Play," {Object}: "Song Y," {Object Preposition}: "by," and {Object Modifier}: "Artist X." The NER component 762 identifies "Play" as a verb, which an IC component 764 may determine corresponds to a <PlayMusic> intent. At this stage, no determination has been made as to the meaning of "Song Y" and "Artist X," but based on grammar rules and models, the NER component 762 has determined the text of these phrases relates to the grammatical object (i.e., entity) of the user input represented in the text data.

The models linked to the intent are then used to determine what database fields should be searched to determine the meaning of these phrases, such as searching a user's gazetteer 784 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 784 does not resolve a slot/field using gazetteer information, the NER component 762 may search a database of generic words (e.g., in the knowledge base 772). For example, if the text data includes "play songs by Artist X," after failing to determine an album name or song name called "songs" by "the Artist X," the NER component 762 may search the database for the word "songs." In the alternative, generic words may be checked before the gazetteer information, or both may be tried, potentially producing two different results.

Figure 8A:
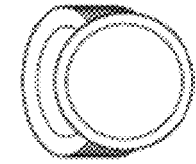
Figure 8B:
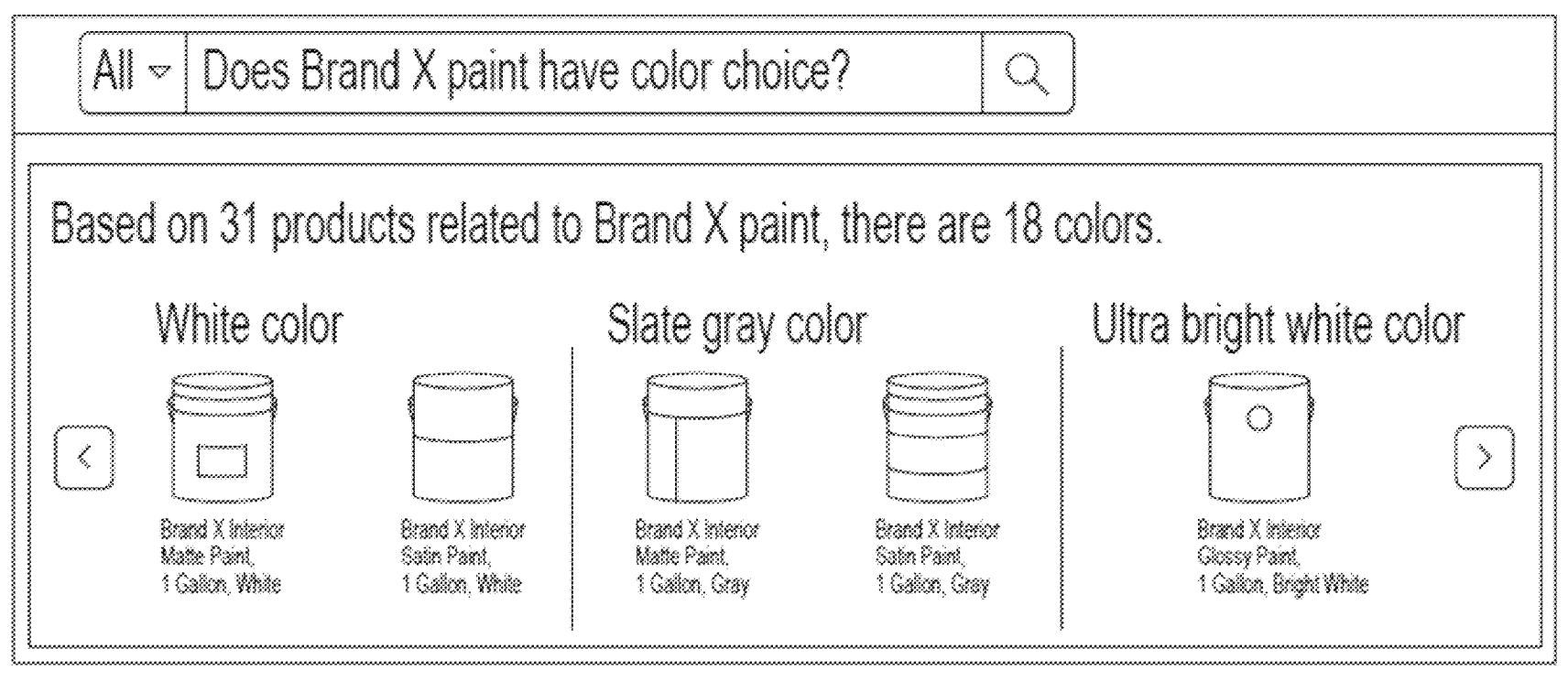
Figure 8C:
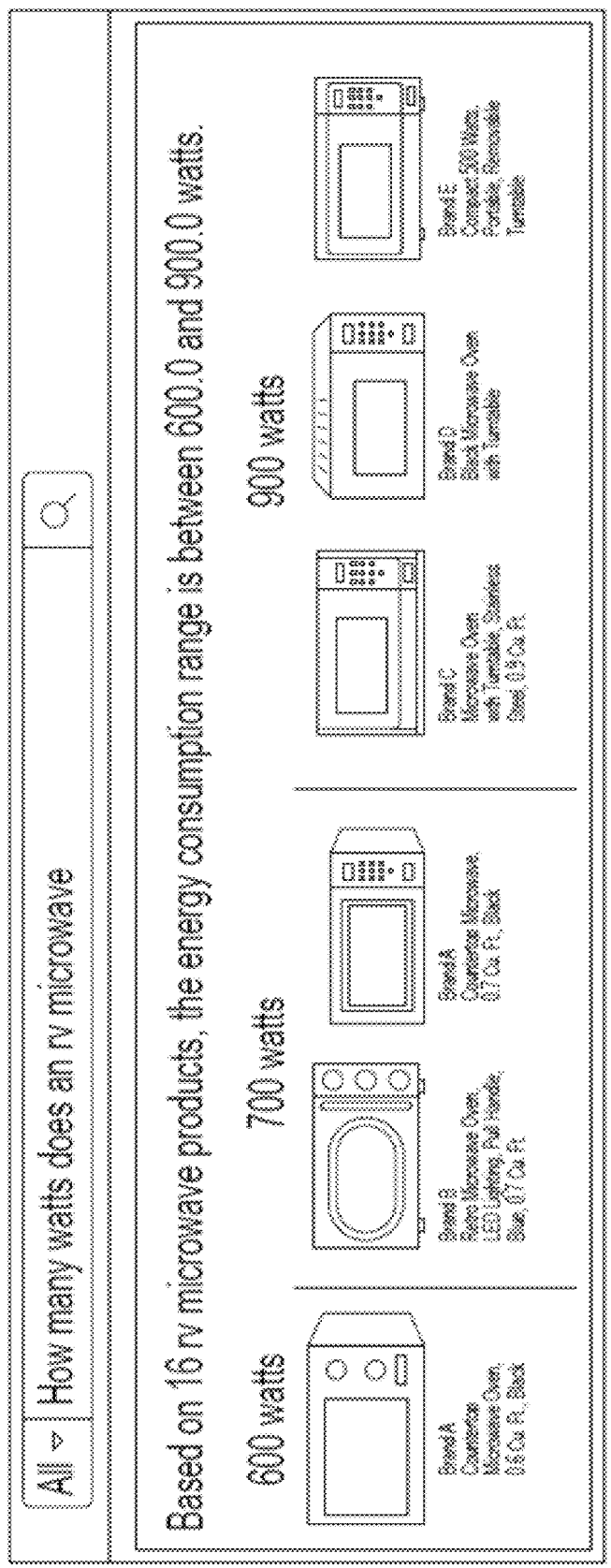

FIGS. 8A, 8B, and 8C depict example response templates generated using the natural language-based question answering system described herein, in accordance with various aspects of the present disclosure. In various examples, answers may be provided using a voice interface (e.g., via TTS 280) and/or via a graphical user interface (GUI). If a GUI is used, embedded content item links may be included in the natural language responses. Example response templates may be used to provide embedded links to specific content items and relevant information gathered from the relevant content items.

For example, for the user question "how long is a pocket knife?", a response template may be used to output:

Answer: Based on 13 pocket knife items, the blade length range is between 2.5 and 4.1 inches. Items with the shortest blade length include the [embedded hyperlink to content item 1] and [embedded hyperlink to content item 2]. Items with the longest blade length are [embedded hyperlink to content item 3] and [embedded hyperlink to content item 4].

Note that in this example, the specific content items are determined using the various techniques described above based on attribute values for the predicted attribute determined using the natural language input (e.g., the user question).

In another example, for the user question "Can I put plastic plates in the dishwasher?" (depicted in FIG. 8A), a response template may be used to output:

Answer: Typically yes, based on 42 plastic plates items, the answer is yes for 34 <click to list> and no for 8<click to list>.

In various examples, a GUI widget may be used to provide the aggregated answer (e.g., similar to the example answers provided above) along with content item images, and links to enable the user to explore and make decisions concerning different content items. FIG. 8B depicts an example of a categorical response template, where the user has input the natural language question, "Does Brand X paint have color choice." Different content related to "Brand X paint" may be selected as the filtered set of content items 116 (post relevance filtering 118). The predicted attribute 124 may be color. In this example, the relevant set of content items 116 are described (e.g., "Based on 31 products related to Brand X paint . . . "). Additionally, the number of different categorical attribute values for the predicted attribute 124 of color are listed (e.g., " . . . there are 18 colors."). In the example of FIG. 8B, a few of the relevant content items are shown along for different categorical attribute values (e.g., White color, Slate gray color, Ultra bright white color). Additionally, graphical controls are provided (left and right arrows) allowing the user to see additional options (e.g., among the 31 content items and the 18 colors).

FIG. 8C displays another example response template for the input natural language query "How many watts does an rv microwave." In this case, a range of attribute values has been determined across the filtered relevant products for the predicted attribute 124 (e.g., energy consumption). The range is between 600.0 and 900.0 watts. Example content is shown with a attribute value label for different ranges of values for the predicted attribute 124 (e.g., a first microwave with 600 watts energy consumption, two microwaves with 700 watts energy consumption, and three microwaves with 900 watts energy consumption. Among other potential benefits, the systems and techniques described herein provide technical improvements for existing natural language processing systems, by providing the architecture and techniques that may be used to enable computer-implemented natural language processing systems to answer questions related to broad and/or generic classes of content items (as opposed to questions related to specific data records). Prior to the various techniques described herein, existing computer-implemented natural language processing systems were unable to answer questions related to broad and/or generic classes of content items in a natural and accurate manner that is easily interpretable and/or useful to a user.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of natural language processing, comprising:
   receiving a first search query comprising first natural language data;
   determining, using a named entity recognition component, first slot data of the first natural language data, the first slot data identifying a first class of content;
   determining a set of other content by using the first slot data as a second search query of a search engine, the set of other content comprising a plurality of items related to the first slot data;
   determining, using a first machine learning model, a first relevance score between a first item of the plurality of items and the first slot data;
   determining a set of attributes of the first item, wherein each attribute of the set of attributes is associated with a respective attribute value for the first item;
   inputting the first natural language data into a second machine learning model;
   determining, by the second machine learning model, a respective second relevance score between the first natural language data and each attribute of the set of attributes;
   selecting a first attribute among the set of attributes using the second relevance score of the first attribute;
   determining the attribute value associated with the first attribute for the first item;
   selecting a response template to respond to the first natural language data;
   generating second natural language data according to the response template, the second natural language data comprising a response to the first natural language data, the second natural language data including the attribute value associated with the first attribute for the first item;
   generating, using a text-to-speech (TTS) component, first audio data representing the second natural language data; and
   outputting the first audio data.

2. The computer-implemented method of claim 1, further comprising:
   sending, to the second machine learning model, an input comprising first data representing a question, second data representing a candidate answer to the question, and third data indicating whether the candidate answer of the second data is an appropriate response to the question of the first data, wherein the candidate answer relates to a first attribute;
   generating, by the second machine learning model, fourth data representing a prediction for the input, wherein the prediction is related to the first attribute;

determining an error by comparing the fourth data to the third data; and
updating parameters of the second machine learning model using the error.

3. The computer-implemented method of claim 1, further comprising:
determining a second attribute among the set of attributes;
determining an attribute value associated with the second attribute for the first item; and
normalizing the attribute value associated with the first attribute and the attribute value associated with the second attribute so that the attribute value associated with the first attribute and the attribute value associated with the second attribute are of the same dimensions;
wherein the selecting the first attribute among the set of attributes is based on a comparison of the normalized attribute value associated with the first attribute and the normalized attribute value associated with the second attribute.

4. A method of natural language processing comprising:
receiving, by a natural language processing system, first natural language data;
determining, by the natural language processing system, first slot data included in the first natural language data, the first slot data identifying first content;
determining a set of content items associated with the first slot data;
inputting the first natural language data into a first machine learning model;
generating, by the first machine learning model using the first natural language data, prediction data associated with a first attribute among a list of attributes of the set of content items;
determining, for a first content item of the set of content items, a first value associated with the first attribute for the first content item;
generating second natural language data based at least in part on the first value, the second natural language data comprising a response to the first natural language data;
generating, using a text-to-speech (TTS) component, first audio data representing the second natural language data; and
outputting the first audio data.

5. The method of claim 4, further comprising:
determining, for a second content item of the set of content items, a second value associated with the first attribute for the second content item, wherein the second natural language data describes a range of values between the first value and the second value or an average value determined using at least the first value and the second value.

6. The method of claim 4, further comprising:
determining a set of historical data representing content items that have been interacted with during a past time period; and
querying the set of historical data using the first slot data to determine the set of content items.

7. The method of claim 4, further comprising:
generating first query data comprising the first slot data;
inputting the first query data into an online search engine; and
determining the set of content items associated with the first slot data in response to inputting the first query data into the online search engine.

8. The method of claim 4, further comprising:
filtering the set of content items for relevance to the first slot data by inputting the first slot data and data representations of the set of content items into a second machine learning model; and
generating, by the second machine learning model based on a correspondence between the first slot data and the data representations, a subset of the set of content items, wherein the first content item is among the subset.

9. The method of claim 4, further comprising:
determining, for the set of content items, a set of attributes; and
determining, for the first content item, a respective attribute value for each attribute of the set of attributes.

10. The method of claim 4, further comprising:
sending, to the first machine learning model, an input comprising first data representing a question, second data representing a candidate answer to the question, and third data indicating whether the candidate answer of the second data is an appropriate response to the question, wherein the candidate answer relates to a first attribute;
generating, by the first machine learning model, fourth data representing a prediction for the input, wherein the prediction is related to the first attribute;
determining an error by comparing the fourth data to the third data; and
updating parameters of the first machine learning model using the error.

11. The method of claim 10, wherein the first machine learning model is trained to predict a respective relevance score for each attribute among the list of attributes.

12. The method of claim 4, further comprising:
selecting the first content item for inclusion in the second natural language data based at least in part on the first value associated with the first attribute being higher than scores associated with any other attribute of the list of attributes.

13. The method of claim 4, further comprising:
determining, using the first machine learning model, a respective ranked list of attributes for each content item of the set of content items;
determining that a first average ranking of the first attribute across each content item is higher than an average ranking of any other attribute; and
selecting the first attribute based at least in part on the first average ranking of the first attribute across each content item.

14. A system for natural language processing comprising:
at least one processor; and
non-transitory computer-readable memory storing instructions that, when executed by the at least one processor, are effective to:
receive first natural language data;
determine first slot data included in the first natural language data, the first slot data identifying first content;
determine a set of content items associated with the first slot data;
input the first natural language data into a first machine learning model;
generate, by the first machine learning model using the first natural language data, prediction data associated with a first attribute among a list of attributes of the set of content items;
determine, for a first content item of the set of content items, a first value associated with the first attribute for the first content item;

generate second natural language data based at least in part on the first value, the second natural language data comprising a response to the first natural language data;

generate, using a text-to-speech (TTS) component, first audio data representing the second natural language data; and output the first audio data.

15. The system of claim 14, the non-transitory computer-readable memory storing further instructions that, when executed by the at least one processor, are further effective to:

determine, for a second content item of the set of content items, a second value associated with the first attribute for the second content item, wherein the second natural language data describes a range of values between the first value and the second value or an average value determined using at least the first value and the second value.

16. The system of claim 14, the non-transitory computer-readable memory storing further instructions that, when executed by the at least one processor, are further effective to:

determine a set of historical data representing content items that have been interacted with during a past time period; and query the set of historical data using the first slot data to determine the set of content items.

17. The system of claim 14, the non-transitory computer-readable memory storing further instructions that, when executed by the at least one processor, are further effective to:

generate first query data comprising the first slot data;
input the first query data into an online search engine; and
determine the set of content items associated with the first slot data in response to inputting the first query data into the online search engine.

18. The system of claim 14, the non-transitory computer-readable memory storing further instructions that, when executed by the at least one processor, are further effective to:

filter the set of content items for relevance to the first slot data by inputting the first slot data and data representations of the set of content items into a second machine learning model; and generate, by the second machine learning model based on a correspondence between the first slot data and the data representations, a subset of the set of content items, wherein the first content item is among the subset.

19. The system of claim 14, the non-transitory computer-readable memory storing further instructions that, when executed by the at least one processor, are further effective to:

determine, for the set of content items, a set of attributes; and determine, for the first content item, a respective attribute value for each attribute of the set of attributes.

20. The system of claim 14, the non-transitory computer-readable memory storing further instructions that, when executed by the at least one processor, are further effective to:

send, to the first machine learning model, an input comprising first data representing a question, second data representing a candidate answer to the question, and third data indicating whether the candidate answer of the second data is an appropriate response to the question, wherein the candidate answer relates to a first attribute;

generate, by the first machine learning model, fourth data representing a prediction for the input, wherein the prediction is related to the first attribute;

determine an error by comparing the fourth data to the third data; and update parameters of the first machine learning model using the error.

* * * * *